United States Patent [19]

Gasner

[11] 3,868,863

[45] Mar. 4, 1975

[54] STAMPED SHEET METAL CHAIN SAW SPROCKET

[75] Inventor: William Lavier Gasner, Carson, Calif.

[73] Assignee: McCulloch Corporation, Los Angeles, Calif.

[22] Filed: Oct. 19, 1973

[21] Appl. No.: 404,645

Related U.S. Application Data

[63] Continuation-in-part of Ser. No. 304,313, Nov. 7, 1972, Pat. No. 3,786,687.

[52] U.S. Cl.............................. 74/243 CS, 30/381
[51] Int. Cl........................................ F16h 55/00
[58] Field of Search............ 74/243 R, 243 CS, 229, 74/230.8; 30/381, 382, 383, 384, 385

[56] References Cited
UNITED STATES PATENTS

| | | | |
|---|---|---|---|
| 2,931,094 | 4/1960 | Teerlink | 74/230.8 |
| 3,045,502 | 7/1962 | Carlton | 74/243 CS |
| 3,087,350 | 4/1963 | Reed | 74/243 CS |
| 3,144,890 | 8/1964 | Irgens | 74/243 CS |
| 3,279,272 | 10/1966 | Gudmundsen | 74/243 CS |
| 3,298,406 | 11/1967 | Erickson | 74/243 CS |
| 3,337,940 | 8/1967 | Stihl et al. | 74/243 CS |
| 3,498,346 | 3/1970 | Gasner et al. | 74/243 CS |
| 3,683,980 | 8/1972 | Gasner | 74/243 CS |

Primary Examiner—Samuel Scott
Assistant Examiner—Allan R. Burke
Attorney, Agent, or Firm—Burns, Doane, Swecker & Mathis

[57] ABSTRACT

A stamped, generally annular sheet metal sprocket includes an undulating surface extending an entire annular width to provide a set of oppositely facing, open ended tang receiving pockets. Apertures may be provided in the sprocket to facilitate attachment of the sprocket to an appropriate surface.

10 Claims, 6 Drawing Figures

STAMPED SHEET METAL CHAIN SAW SPROCKET

CROSS-REFERENCE TO RELATED APPLICATIONS

This application is a continuation-in-part application of application Ser. No. 304,313, filed Nov. 7, 1972, now U.S. Pat. No. 3,768,687, issued Jan. 22, 1974.

BACKGROUND OF THE INVENTION

This invention relates generally to a novel sprocket. More particularly, the invention concerns a stamped sprocket for driving a chain of a chain saw.

Chain saws generally comprise four major components, namely, an endless saw chain to do the cutting, an elongated bar or arm to support the chain and around the edges of which the chain is constrained to travel, power means, usually comprising a prime mover such as a gasoline engine or an electric motor, and means to drivingly connect a drive shaft of the power means with the saw chain.

It is the means providing the driving connection between the drive shaft of the power means and the saw chain to which the present invention is directed. In the past, the driving means for the saw chain has included a drive sprocket. This drive sprocket is ordinarily supported for rotation by the drive shaft of the power means, and is drivingly connectable therewith by a clutch mechanism.

Conventionally, the sprocket of a chain saw is connected to a clutch drum of the clutch mechanism by brazing, silver soldering, or an equivalent bonding operation. In some instances, it may be desirable to utilize a novel integral sprocket and clutch drum such as that described in the above-referenced copending application, the entire disclosure of which is incorporated hereinto by reference.

It will be appreciated that the stamped sprocket disclosed therein is significantly advantageous quite apart from the advantages realizable by the unitized nature of the integrated sprocket and clutch drum article. In particular, that sprocket, whether unitized with a clutch drum or separate therefrom, embodies the advantages of the sprocket disclosed in U.S. Pat. No. 3,279,272 to A Gudmundsen, while additionally providing a sprocket amenable to inexpensive and readily reproducible fabrication with a minimum of material.

The Gudmundsen sprocket is known in the prior art to be a highly satisfactory and advantageous article. However, it will be noted that the Gudmundsen sprocket is disclosed as being cast, forged, or sintered from powdered metal. Certain features of the Gudmundsen sprocket militate against fabricating that sprocket by a stamping process. For example, the interior cylindrical bore 27 and the back wall 48 would be extremely difficult, if not impossible, to fabricate in a stamping or other cold working process.

It would, however, be desirable to retain the advantages of the sprocket disclosed in the Gudmundsen patent while facilitating fabrication of the sprocket, utilizing a minimun of material, through stamping or other cold working process.

OBJECTS AND SUMMARY OF A PREFERRED FORM OF THE INVENTION

Recognizing the foregoing, it is a general object of the present invention to provide a novel sprocket which may be fabricated by a cold working process.

It is a particular object of the invention to provide a novel sprocket which may be simply and economically fabricated from a sheet metal pressing or stamping operation.

It is likewise an object of the present invention to eliminate machining or finishing steps required in the fabrication of known chain saw sprockets.

It is similarly an object of the present invention to provide a novel sprocket for a chain for a chain saw comprised of a single stamped sheet of metal.

It is another object of the present invention to provide a novel sprocket for a chain saw which may be manufactured at a fraction of the cost of known sprockets.

Yet another object of the present invention is to provide a novel sprocket for a chain of a chain saw which will drive the chain, guide the chain along a circular path, and aid in preventing lateral movement of the chain with respect to the plane of its path.

A sprocket according to a preferred embodiment of the present invention intended to accomplish some of the foregoing objects may be fabricated from a generally annular sheet metal blank. The blank is stamped so as to form eight notches or pockets which extend across the entire width of the annulus. These pockets are operable to receive projections on a chain for a chain saw. The sprocket thus formed may have rivet receiving holes to facilitate attaching the sprocket to a clutch drum. Similarly, a mounting hub may be brazed to the sprocket to provide an assembly suitable to receive a supporting shaft.

Whereas a sprocket embodying the features of the present invention may be used for the many various purposes for which a sprocket may have been utilized in the prior art, a primary feature of usefulness for a sprocket embodying the present invention is in connection with engine drive chain saws where it is desirable to prevent sidewise movement of the chain as it travels over the sprocket.

THE DRAWINGS

Other objects and advantages of the present invention will become apparent with respect to the following detailed description of a preferred embodiment thereof in connection with the accompanying drawings wherein like reference numerals have been applied to like elements, in which.

DETAILED DESCRIPTION OF A PREFERRED EMBODIMENT OF THE INVENTION

Figure 1:
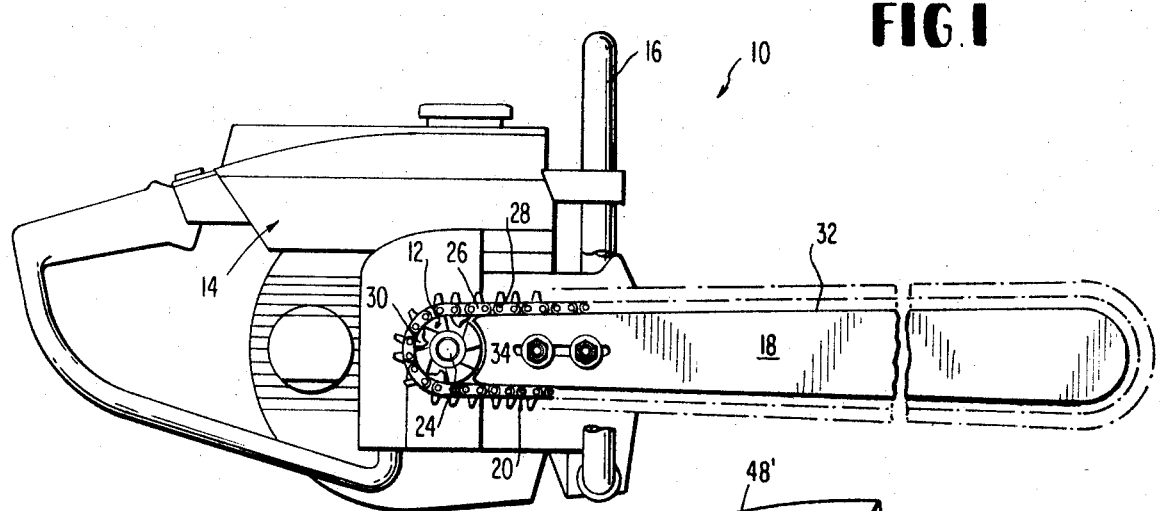
FIG. 1 is an elevational view of a chain saw, having some parts, including clutch drum, broken away, and embodying a sprocket of the present invention.

Referring now to the drawings, wherein like reference characters have been applied to like parts throughout, in FIG. 1 there can be seen an engine driven chain saw 10 utilizing a chain engaging sprocket 12 of the present invention. The chain saw 10 comprises an engine 14, a frame portion 16, a cutter bar or blade 18, and a saw chain 20 which is driven by the engine 14 and which travels on the cutter bar 18. The saw chain 20 is driven by the sprocket 12 in a conventional manner. A hub 22 (see FIG. 5) may be attached to the sprocket 12 by conventional means such as brazing to facilitate assembly of the sprocket onto a shaft 24 of the chain saw The articulate saw chain 20 includes links 26 connected consecutively by pintles 28. Extending inwardly on the chain 20 on some of the links 26 are sprocket engaging tangs 30 which extend into a groove (not shown) on the cutter bar 18. The links 26 ridge along an outer peripheral edge 32 of the cutter bar 18. As the saw chain 20 moves along a lower portion 34 of the bar 18, a train of consecutive tangs 30 are engaged successively by the tang pockets 36 which are open at both ends. As will be more fully explained below, alternate pockets receive successive tangs throughout the operation of the chain saw to maintain the saw chain in a plane defined by its path of travel.

Figure 2:
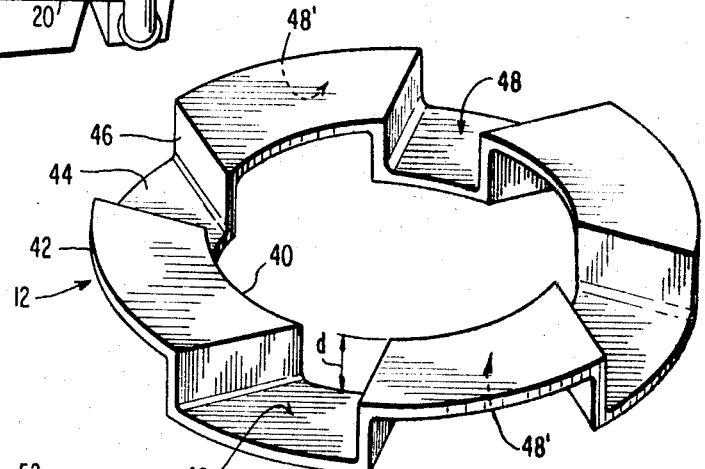
FIG. 2 is a perspective view of the sprocket used in the chain saw of FIG. 1, looking at the opposite side of the assembled sprocket.

In FIG. 2 there may be seen a sprocket 12 embodying the present invention. The sprocket is essentially annular in shape and is defened by an inner circumferentially extending wall 40, an outer circumferentially extending wall 42, and a plurality of pocket faces 44 extending fully between those walls 40 and 42. The pocket faces are disposed in an endless series of alternate relative protruded and depressed positions.

The tang pocket faces 44 are disposed in an undulating arrangement so that the annulus appears to have generally radially extending, open ended channels. Adjacent tang pocket faces are joined by tang pocket sidewalls 46. Each tang pocket is defined by a tang pocket face 44, two tang pocket sidewalls 46, and a portion of both the inner and outer circumferentially extending walls 40 and 42 respectively. The two tang pocket sidewalls for any given tang may be angulated to facilitate operation.

As may be seen from FIG. 2, a particular preferred embodiment of the present invention may include four upwardly facing tang pockets 48 and four downwardly facing tang pockets 48'.

The upwardly facing tang pockets 49 lie in a depressed plane and the downwardly facing tang pockets 48' lie in a spaced apart but parallel protruded plane. These planes are spaced apart from each other by a distance d which approximates the width of the tangs 30 of the chain 20. This arrangement provides an endless series of oppositely facing tang receiving pockets 48, 48' operable to receive successive tangs on the saw chain in such a manner that the chain is constrained against lateral displacement with respect to a plane defined by a travel path of the saw chain. This is, movement at right angles to the direction of movement of the chain 20 is essentially prevented by the tang pocket faces of the alternate tang pockets. Since the chain is relatively rigid at right angles to its plane of movement, this rigidity and the aternate pockets cooperate to militate against chain movement laterally because each of the tangs of the chain is held by the alternate faces of the tang pockets.

In a preferred form of the present invention, the sidewalls 46 of each tang pocket are angulated to a different extent as will be more fully explained below.

Figure 3:
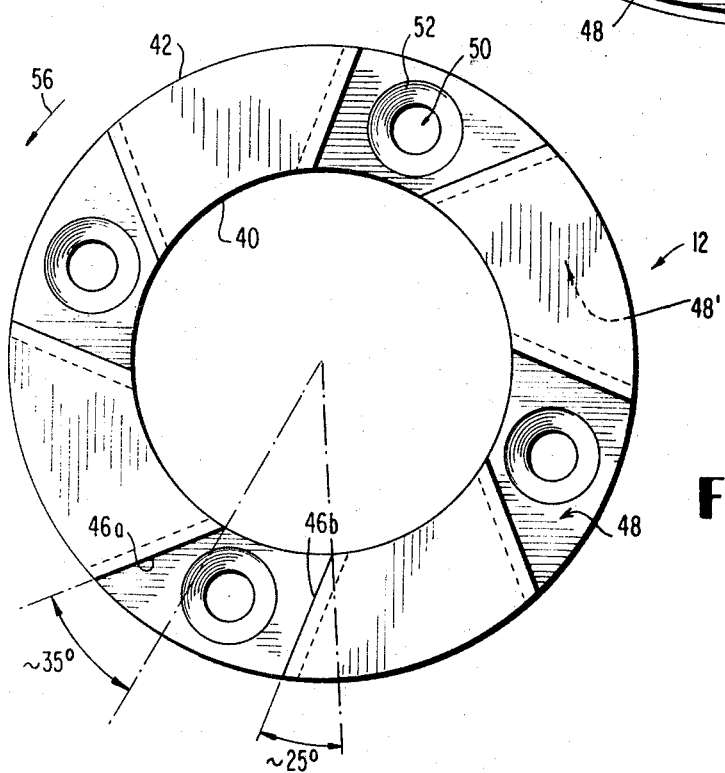
FIG. 3 is a top view of a sprocket according to the present invention wherein rivet receiving holes have been included, and again looking at the opposite side of the assembled sprocket from that shown in FIG. 1.

Referring now to FIG. 3, there may be seen a top view of the sprocket 12 of FIG. 2 wherein four rivet receiving holes 50 have been bored in the four tang pocket faces 44 of the upwardly facing tang pockets 48. Each of these holes 50 may be defined by a beveled edge 52 appropriately angled to accommodate a suitable rivet 54 (see FIG. 4).

As viewed in FIG. 3, the sprocket 12 would rotate in operation in a counterclockwise direction as indicated by an arrow 56. Upon examination of a tang pocket, it will be appreciated that the sidewalls 46 may be angulated to a different extent. The extent of angulation of each sidewall may be determined by measuring an angle formed between a line on the sidewall which is parallel to the plane of the face of the tang pocket and a radius of the sprocket which intersects the sidewall at a point nearest or proximal to the center of the sprocket. Thus, it may be seen that in accordance with the present invention, one sidewall 46a is angulated at approximately 35° and the other sidewall 46b is angulated at approximately 25°. This difference in angulation may result in an ease of entry of a front portion of a tang into the tang receiving pocket and an ease of exiting of a rear portion of the tang out from the tang receiving pocket. It should be understood that a design may be made to include a different number of sprocket teeth and/or a different pitch that would necessitate altering the angular distance between teeth and the angulated location of the walls of the tang pockets.

This difference in angulation of the sidewalls of each respective tang pocket results in the formation of a series of asymmetrical tang pockets. This asymmetrical arrangement may result in an improved chain travel around the sprocket in that the forces tending to displace the chain from its intended path of travel are minimized. In addition, through the present invention, formation of the selected angle of each of the sidewalls within appropriate tolerances is facilitated.

Figure 4:
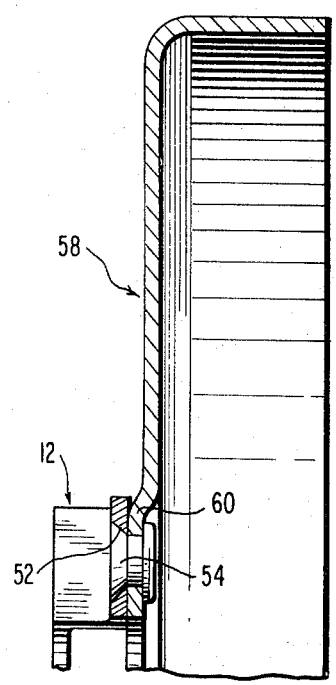
FIG. 4 is a cross-sectional view of the sprocket of FIG. 3 attached to a clutch drum.

In FIG. 4 there may be seen the sprocket 12 of FIG. 3 attached to a clutch drum 58 for a chain saw. A rivet 54 may be used to attach the sprocket to a portion 60 of the clutch drum. It will, of course, be appreciated that the sprocket may be brazed, welded or similarly attached to the clutch drum 58.

Figure 5:
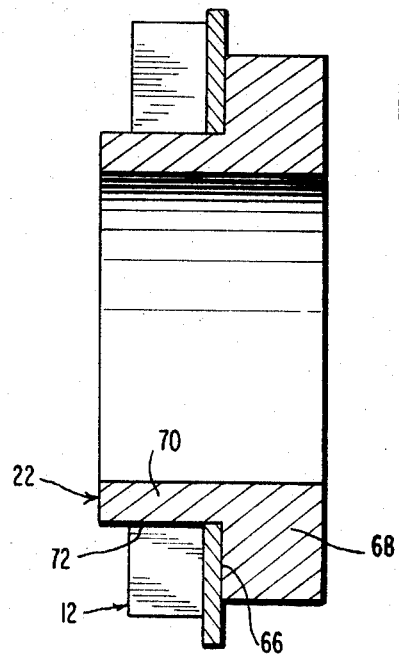
FIG. 5 is a cross-sectional view of the sprocket of FIG. 2 and including a mounting hub which has been brazed to the sprocket.

In certain instances, it may be desirable to attach a mounting hub 22 to the sprocket in a manner as shown in FIG. 5. This mounting hub can be brazed to a back 66 of the tang pocket faces.

The mounting hub 22 may be comprised of a base portion 68 and a stem portion 70. With the hub in place, the sprocket may be mounted on a shaft of a chain saw engine. An exterior wall 72 of the stem portion 70 of the hub will form a bottom wall for each of the eight successive open ended tang pockets. The base portion of the hub extends radially outwardly an appropriate distance to accommodate a braze sufficient to secure the sprocket to the hub.

In the fabrication of the sprocket according to the present invention, a low carbon steel having an approximate thickness of 0.050 inch is preferable. The utilization of low carbon steel substantially reduces the stress in the sprocket during fabrication. Since low carbon steel is relatively soft, an annular blank will offer less resistance to a stamping operation. This stamping operation may be performed with an appropriate tool of a conventional type. To provide additional strength to the sprocket and to increase its resistance to wear, it may be desirable to harden the sprocket subsequent to stamping by a surface hardening process, such as by the use of cyanides, carbonization operations, and other similar surface hardening techniques which are well known in the metal arts. Thus, it can be seen that in accordance with the present invention, a stamped sprocket may be fabricated from relatively soft sheet metal while at the same time providing increased resistance to wear.

It will be appreciated that a variety of cold working processes may be utilized in the fabrication of the sprocket in the present invention.

It will also be appreciated that in fabricating a sprocket according to the present invention, certain significant advantages are provided. In particular, the absence of a bottom wall and of an inner cylindrical surface permits the sprocket of the present invention to be easily and relatively inexpensively fabricated to acceptable tolerances and with sufficient resistance to wear, while retaining the advantages of preventing sidewise movement of the chain as it travels over the sprocket.

In addition, the open pockets are considerably less inclined to accumulate dirt, wood chips, or other materials which might impede the operation of many conventional sprockets. It may also be noted that the sprocket of the present invention will prevent sidewise movement of the chain as it drives over the sprocket and will tend to minimize those forces which tend to remove the chain from the sprocket.

Moreover, the stamping process insures that the undulations of the tang pocket faces will be relatively uniform.

Figure 6:
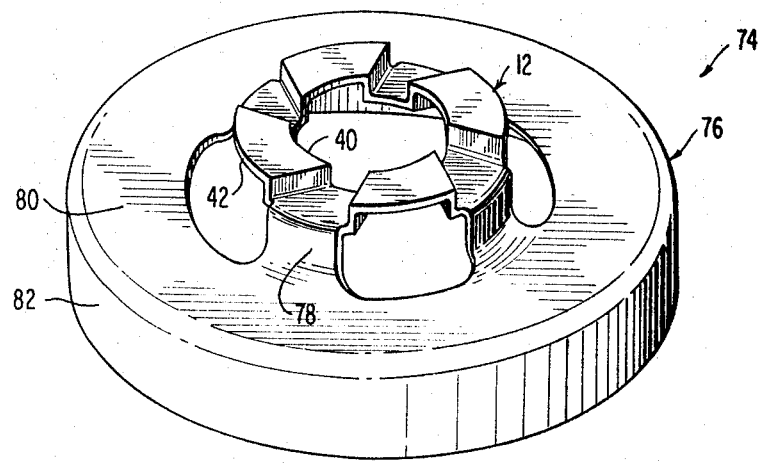
FIG. 6 is a view of the sprocket according to the present invention embodied as an integrated unit with a clutch drum, and once again looking at the opposite side of the assembled sprocket from that shown in FIG. 1.

As depicted in the copending application Ser. No. 304,313, filed Nov. 7, 1972, the sprocket of the present invention may be embodied in an integral clutch drum and sprocket unit 74, as shown in FIG. 6. The sprocket 12 and a clutch drum 76 may be cold formed from a single blank. Four integral webs 78 provide the means by which the sprocket is unitized with the clutch drum portion 76 of the unit. The webs 78 carry the sprocket 12 at an appropriate distance from the base portion 80 so as to provide satisfactory clearance for cutter hooks on the saw chain (not shown in FIG. 6).

The clutch drum has a planar base portion 80 and an integral cylindrical wall 82 the inside of which functions as a friction surface. It will be appreciated that the friction surface is cooperable with a variety of clutch mechanisms not here shown.

Although the present invention has been described in conjunction with specific embodiments thereof, it is evident that many alternatives, modifications, and variations will be apparent to those skilled in the art in light of the foregoing disclosure of the invention. Accordingly, it is intended that all such alternatives, modifications, and variations which fall within the spirit and scope of the invention as defined in the appended claims be embraced thereby.

What is claimed is:

1. A sprocket for driving a chain of a chain saw comprising: an annular stamped, sheet metal, chain engaging means for receiving a train of tangs on a saw chain comprising:

an annulus having an endless series of circumferentially spaced apart faces disposed in alternate relative protruded and depressed positions;

said faces disposed in said relative protruded position operable to define a first plane;

said faces disposed in said relative depressed position operable to define a second plane;

said first and said second planes being parallel and spaced apart a distance to define therebetween a generally planar saw chain travel path resistive of lateral saw chain displacement;

sidewall means extending an entire annular width of said annulus and contiguous with said protruded and depressed faces for forming a series of tang receiving pockets extending an entire annular width of said annulus and open at both ends to provide a sprocket for receiving successive tangs on a chain of a chain saw.

2. The sprocket of claim 1 and including a plurality of rivet receiving means for receiving a rivet means to attach said sprockets to an adjacent surface.

3. The sprocket of claim 2 wherein said adjacent surface is a portion of a clutch mechanism.

4. The sprocket of claim 1 wherein said sidewall means for forming a series of tang receiving pockets comprise first and second angulated face means for guiding a portion of a saw chain tang into and out from a tang receiving pocket, said first and second angulated face means being angulated to a different extent to provide a series of assymetrical tang receiving pockets for successively receiving tangs on the chain.

5. A sprocket for driving a chain of a chain saw comprising:

an annular chain carrying means for driving an articulate chain, said carrying means comprising an annulus bounded by inner circumferentially extending wall means and outer circumferentially extending wall means, said inner and said outer circumferentially extending wall means, and the annulus therebetween, undulating to define a series of alternate, open-ended, protrusions and depressions; and side wall means contiguous with said inner and said outer circumferentially extending wall means for providing a series of tang receiving pockets, said side wall means further comprising:

first angulated face means for guiding a portion of a saw chain tang into a tang receiving pocket, second angulated face means for guiding a portion of a saw chain tang out from a tang receiving pocket, said first and said second angulated face means being angulated to a different extent to provide a series of asymmetrical tang receiving pockets for successively receiving tangs on the chain.

6. The sprocket of claim 5 and further including clutch drum means attached to said chain carrying means.

7. The sprocket of claim 6 wherein said chain carrying means is riveted to said clutch drum.

8. The sprocket of claim 5 and further including hub means attached to said chain carrying means for mounting said sprocket on the chain saw.

9. A sprocket for driving a chain of a chain saw wherein outwardly open tang receiving pockets are provided in such a manner that successive pockets along the circumference of the sprocket receive and guide successive tangs of the chain to prevent the chain from moving laterally with respect to a plane defined by the path of travel of the chain characterized in that the sprocket is fabricated from an annular, stamped sheet metal member having a series of circumferentially spaced apart faces disposed in alternate relative protruded and depressed positions;

a portion of said faces disposed in said relative protruded position being operable to define a first set of tang receiving pockets having faces lying in a first plane;

another portion of said faces disposed in said relative depressed position operable to define a second set of tang receiving pockets having faces lying in a second plane;

said first and said second planes being parallel and spaced apart a distance to define therebetween a generally planar chain travel path resistive of lateral chain movement; and sidewalls extending a width from an outer circumferential wall to an inner circumferential wall of the sheet metal member and contiguous with said protruded and depressed faces, the sidewalls and the faces forming a series of successive tang receiving pockets open at both ends and extending an entire annular width of the sheet metal member.

10. The apparatus of claim 9 including clutch drum means attached to said sprocket.

* * * * *